(12) United States Patent
Dotti et al.

(10) Patent No.: US 8,353,627 B2
(45) Date of Patent: Jan. 15, 2013

(54) TEMPERATURE SENSOR FOR BURNER, AND BURNER

(75) Inventors: Massimo Dotti, Modena (IT); Massimo Gilioli, Modena (IT); Mario Noli, Modena (IT); Marco Mangiarotti, Modena (IT)

(73) Assignee: Worgas Bruciatori S.r.l., Formigine, Modena (IT)

( * ) Notice: Subject to any disclaimer, the term of this patent is extended or adjusted under 35 U.S.C. 154(b) by 614 days.

(21) Appl. No.: 12/604,878

(22) Filed: Oct. 23, 2009

(65) Prior Publication Data

US 2010/0101553 A1     Apr. 29, 2010

(30) Foreign Application Priority Data

Oct. 24, 2008   (IT) ........................... MI2008A001886

(51) Int. Cl.
   *G01K 1/14*     (2006.01)
   *G01K 7/02*     (2006.01)
(52) U.S. Cl. ........................ 374/179; 374/141
(58) Field of Classification Search ............... 374/179, 374/185, 141, 208, E7.004, E1.018
   See application file for complete search history.

(56) References Cited

U.S. PATENT DOCUMENTS

| | | | |
|---|---|---|---|
| 4,765,183 A | | 8/1988 | Coury |
| 5,176,451 A | * | 1/1993 | Sasada et al. ................ 374/179 |
| 5,393,222 A | | 2/1995 | Sutton |
| 6,118,105 A | * | 9/2000 | Berkcan et al. .............. 374/107 |
| 6,133,552 A | * | 10/2000 | Saulnier et al. ............. 374/132 |
| 6,225,607 B1 | * | 5/2001 | Has et al. ..................... 374/131 |
| 6,354,735 B2 | * | 3/2002 | Thermos et al. ............. 374/179 |
| 7,214,909 B2 | * | 5/2007 | Reiter et al. .......... 374/E15.001 |
| 8,192,081 B2 | * | 6/2012 | Suzuki et al. ................ 374/163 |
| 2001/0002918 A1 | | 6/2001 | Tatoh |
| 2003/0161381 A1 | * | 8/2003 | Morbitzer ..................... 374/208 |
| 2005/0184044 A1 | * | 8/2005 | Reiter et al. ............. 219/448.11 |
| 2005/0286609 A1 | * | 12/2005 | Smolenski et al. ........... 374/141 |
| 2006/0045164 A1 | * | 3/2006 | Schuh et al. ...................... 374/1 |
| 2007/0175266 A1 | * | 8/2007 | Harcourt et al. ............ 73/25.01 |
| 2009/0279585 A1 | * | 11/2009 | Morita et al. ................. 374/185 |
| 2010/0101553 A1 | * | 4/2010 | Dotti et al. .................... 374/141 |
| 2011/0122918 A1 | * | 5/2011 | Murray ......................... 374/208 |
| 2012/0063488 A1 | * | 3/2012 | Nakayama et al. .......... 374/185 |

FOREIGN PATENT DOCUMENTS

| | | |
|---|---|---|
| DE | 4223453 | 1/1994 |
| DE | 9319364 | 2/1994 |
| EP | 0171904 | 2/1986 |
| EP | 0338101 | 10/1989 |
| EP | 0879993 | 3/2003 |
| EP | 1582811 | 10/2005 |
| EP | 2180253 A1 * | 4/2010 |
| GB | 957429 | 5/1964 |
| GB | 2219388 | 12/1989 |
| GB | 2270748 | 3/1994 |
| WO | 2006105137 | 10/2006 |

* cited by examiner

*Primary Examiner* — Yaritza Guadalupe-McCall
(74) *Attorney, Agent, or Firm* — Shoemaker and Mattare

(57) ABSTRACT

A temperature sensor for a burner comprises two metal wires implementing a thermocouple, a protection sheath receiving the two metal wires, and a head in metal material having a front side intended to be facing the environment, the temperature of which is intended to be measured, and a rear side opposite the front side, in which the two metal wires are connected in a thermal exchange relationship to the head rear side, and the head comprises a front portion connectable to a burner wall of the burner so that the thermocouple is connectable to the burner by means of said metal head.

17 Claims, 7 Drawing Sheets

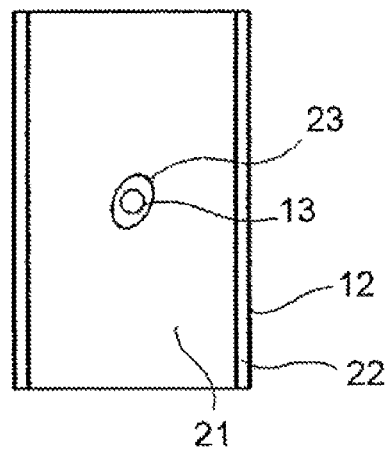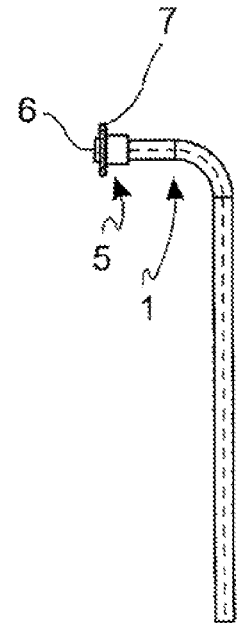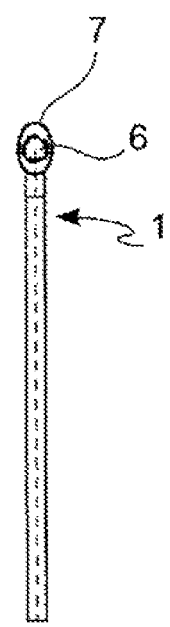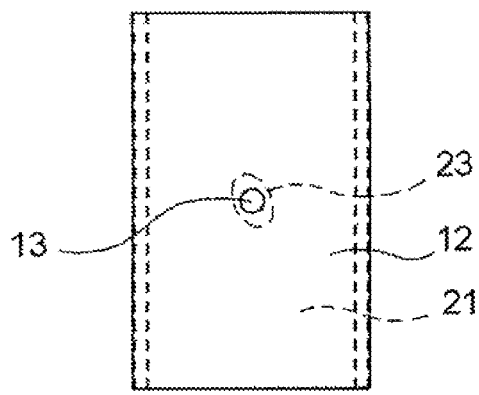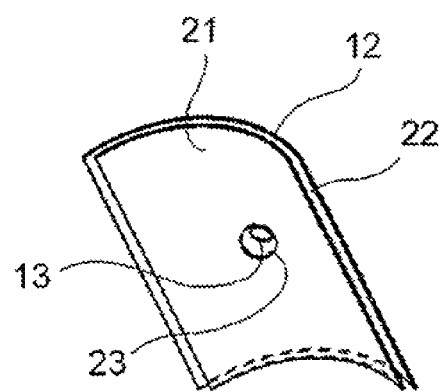
FIG. 11A
FIG. 10A  FIG. 10B
FIG. 11B
FIG. 11C

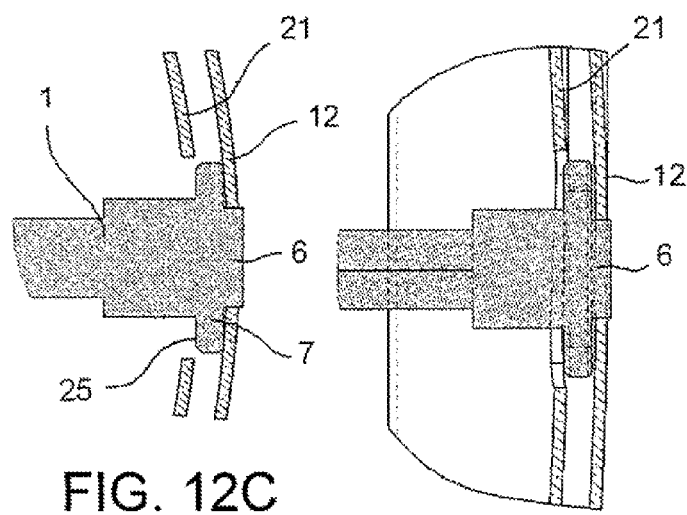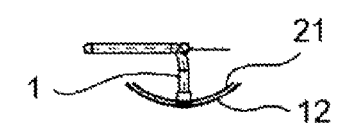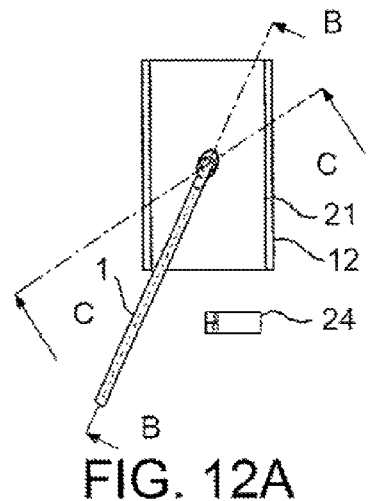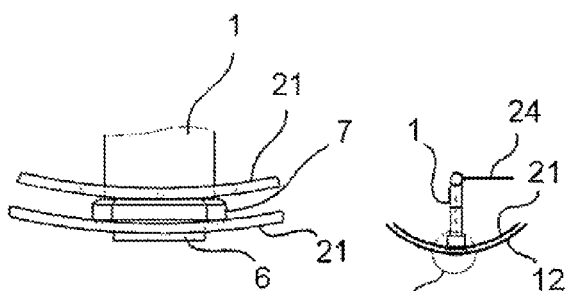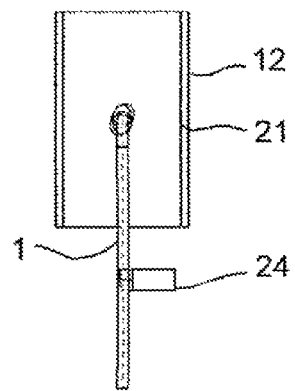

TEMPERATURE SENSOR FOR BURNER, AND BURNER

The present invention relates to a temperature sensor for burners and to a burner provided with such temperature sensor. Particularly, the present invention relates to a thermocouple temperature sensor intended to be connected to a surface of a burner, for example, a gas burner, for industrial and domestic applications.

One of the several uses of the above-mentioned burners is that of the instantaneous or non-instantaneous heaters to heat a fluid, for example, water, which is subsequently conveyed to a use, for example, a heating system of an industrial process, housing environments, or the like.

A known system for the measurement of the temperature of the burning surface of burners provides for the positioning of a thermocouple sensor welded to an outer surface of a burning wall of the burner (FIG. 3B) within the combustion chamber in such a position as to be directly lapped by the combusted fluids. The accuracy and repeatability of such measurement is hindered by the accuracy required in positioning the thermocouple, since a displacement of the sensor of one tenth of millimetre relative to the correct position thereof can involve a variation of the detected temperature of tens of degrees. Furthermore, the cables constituting the temperature sensor that are located within the combustion chamber in the flow of the combusted fluids and in the generated flames are subjected to a high degradation, due to the temperatures and temperature variations to which it is subjected.

A further known system for the measurement of the temperature of burners provides for a temperature sensor welded to an inner surface of a burning wall of the burner (FIG. 3A). This involves a reduction of the sensor degradation thanks to the moving away of the cables constituting it from the hottest zones within the burner. The temperature value detected is always sensitive to positioning errors of the sensor. A displacement of the sensor of one millimetre relative to the correct position thereof can involve a variation of the detected temperature of tens of degrees. Due to the relatively complex geometries of burners, the thermocouple temperature sensor that is welded on the inner surface of the burning wall of the burner (FIG. 3B) cannot be freely positioned at any point, but an appropriate accessibility is necessary for the assembling, which often limits the positioning choices for the thermocouple. This makes these systems not very efficient for a combustion control in boilers requiring an instantaneous and accurate response of the thermal sensor, and which therefore have to be positioned at the area of the burning surface.

A known solution of the thermocouple sensor connection to the burner provides that the thermocouple two metal wires are directly welded on the burner wall inner surface, opposite the inner space of the combustion chamber in which the flames are generated (FIGS. 3 and 3A).

A further known solution provides that two rigid bars of the same material of the thermocouple metal wires are welded to the burner wall inner surface so as to implement extensions or spacers to which the thermocouple sensor metal wires are welded.

Such rigid bars can be welded on the burner wall inner surface (FIG. 4), or they could project inwardly of the combustion chamber and be secured to the burner wall by means of welding operations (outer surface side, or in other terms, "burning surface" of the burner wall) that are directly exposed to the combustion environment (FIG. 5).

All the solutions with rigid bars require additional intermediate welding operations that may be subject to such corrosion as to alter the measurement signal generated by the sensor.

Furthermore, in the known solutions, the two metal wires of the thermocouple sensor for burners are protected by an insulating sheath of flexible material that makes even more difficult a correct positioning of the metal wires during the connection by welding thereof. In addition to this, the flexible sheaths in plastic material or glass fibre/resin are not suitable to resist to the temperatures within the burner; the flexible sheaths in ceramic material, even though they are resistant to the temperatures, however do not ensure a suitable electric insulation of the metal wires.

Therefore, the object of the present invention is to provide a temperature sensor for burners having characteristics such as to allow a positioning thereof with high accuracy and to obviate deformations and degradation of the sensor or parts thereof.

This and other objects are achieved by a temperature sensor for a burner according to claim 1, a burner according to claim 14, and a boiler according to claim 17.

Advantageous embodiments are the subject-matter of the dependant claims.

In order to better understand the invention and appreciate the advantages thereof, a description of some exemplary, non-limiting embodiments will be provided herein below, with reference to the annexed Figures, in which.

Figure 6:
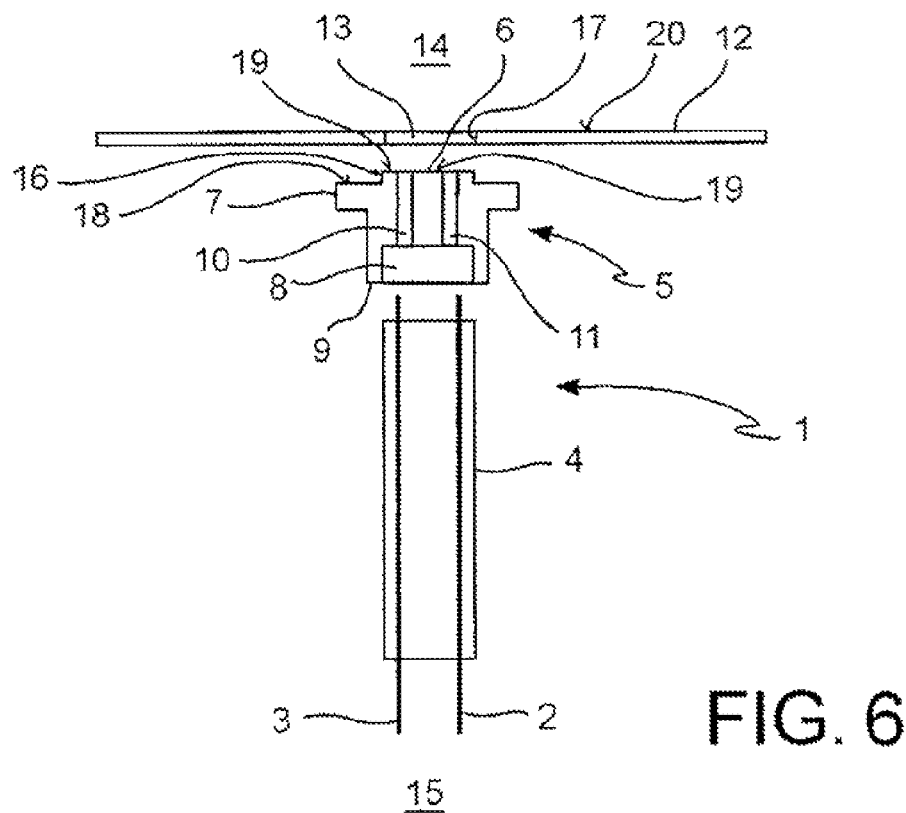
Figure 7:
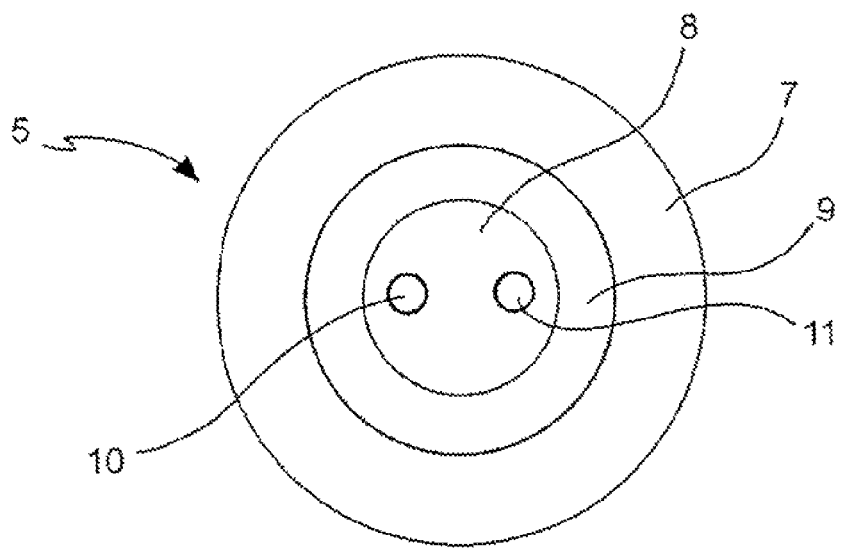
Figure 8:
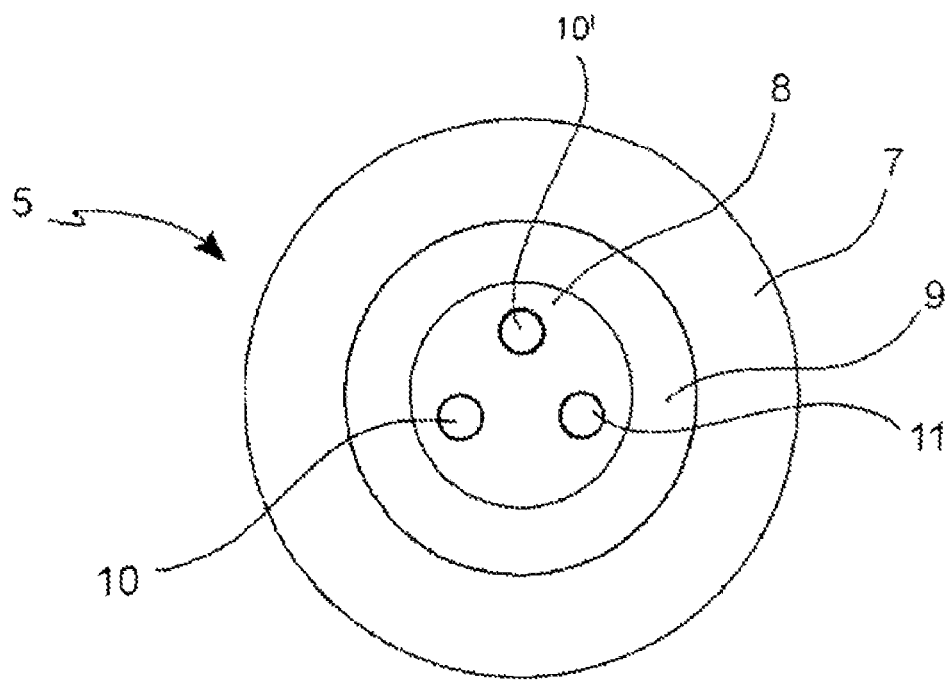
Figure 9:
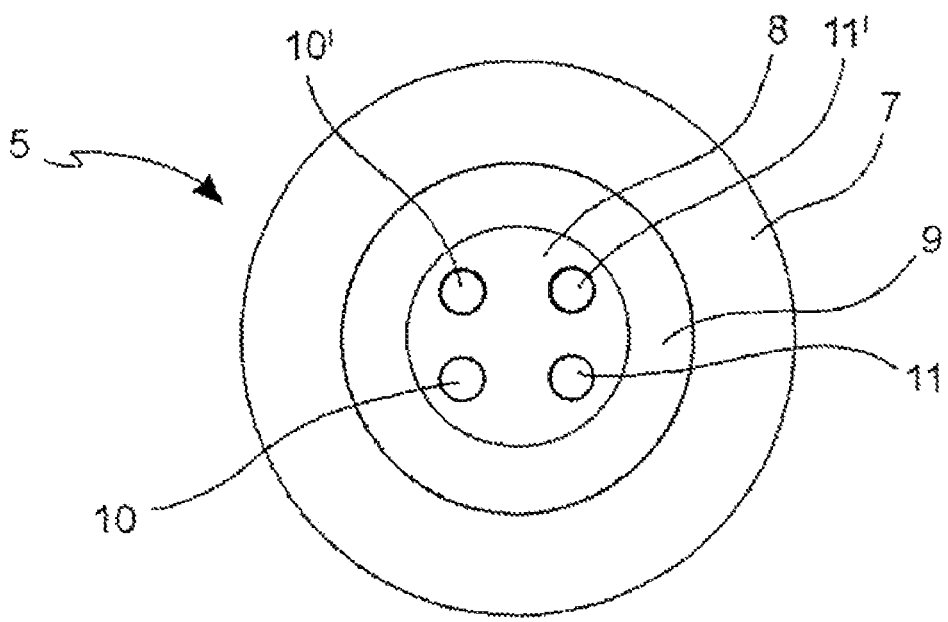

FIGS. 3, 3A, 3B, 4, and 5 are schematized sectional views of measurement systems of the temperature of burners known to the inventor and improved by the present invention;

FIG. 6 is an exploded longitudinal sectional view of a temperature sensor for burners according to an embodiment of the invention, in which the thermocouple seats are implemented by through holes;

FIGS. 7, 8, and 9 are rear views of a sensor head according to different embodiments;

FIGS. 10A and 10B show a temperature sensor in side and front view according to a further embodiment;

FIGS. 11A-11C show a part of a double wall burner in interior, exterior, and perspective view;

FIG. 12A is an interior view of the burner part of FIG. 11, with the temperature sensor of FIGS. 10A and 10B in the insertion step;

FIG. 12B is an enlarged sectional view according to the line B-B in FIG. 12A;

FIG. 12C is an enlarged sectional view according to the line C-C in FIG. 12A;

FIG. 12D is a bottom view of the burner in FIG. 12A;

FIG. 13A is an interior view of the part of the burner in FIG. 11, with the temperature sensor of FIGS. 10A and 10B in the locking position;

FIG. 13B is a bottom view of the burner in FIG. 13A;

FIG. 13C is an enlarged view of the detail C, FIG. 13B;

With reference to the Figures, a temperature sensor for a burner is generally indicated with the reference 1.

The sensor 1 comprises two metal wires 2, 3 that are suitable to implement a thermocouple (Seebeck effect), a protection sheath 4 receiving and wrapping the two metal wires 2, 3, as well as a head 5 in metal material.

The head 5 has a front side 14 intended to be facing the environment, the temperature of which is intended to be measured, and a rear side 15 opposite the front side 14 and to which the two metal wires 2, 3 are connected in a thermal exchange relationship with the head 5.

According to an aspect of the invention, the head 5 comprises a front portion 6 intended to be inserted in a sensor seat 13 of a burner wall 12 of the burner, as well as at least one first positioning surface 16 and at least one second positioning surface 18.

The first positioning surface 16 is configured and suitable to engage an inner surface 17 of the sensor seat 13 so as to prevent displacements of the head 5 in the plane of the burner wall 12, and the second positioning surface 18 is transversal to the first positioning surface 16 and so formed as to be able to engage the burner wall 12 in the proximity of the sensor seat 13 to prevent displacements of the head 5 in the transversal direction to the burner wall 12 plane. Besides preventing undesired displacements or deformations in the plane of the burner wall and transversally thereto, the first and second positioning surfaces 16, 18 of the head 5 advantageously implement reliable references for an easy and accurate positioning of the temperature sensor in the burner.

In accordance with an embodiment, the front portion 6 comprises a measurement front surface 19 intended to be exposed to the environment, the temperature of which is intended to be measured, and/or suitable to complete and constitute the surface, the temperature of which is intended to be measured, and the first positioning surface 16 extends transversally to such measurement surface 19.

Figure 2:
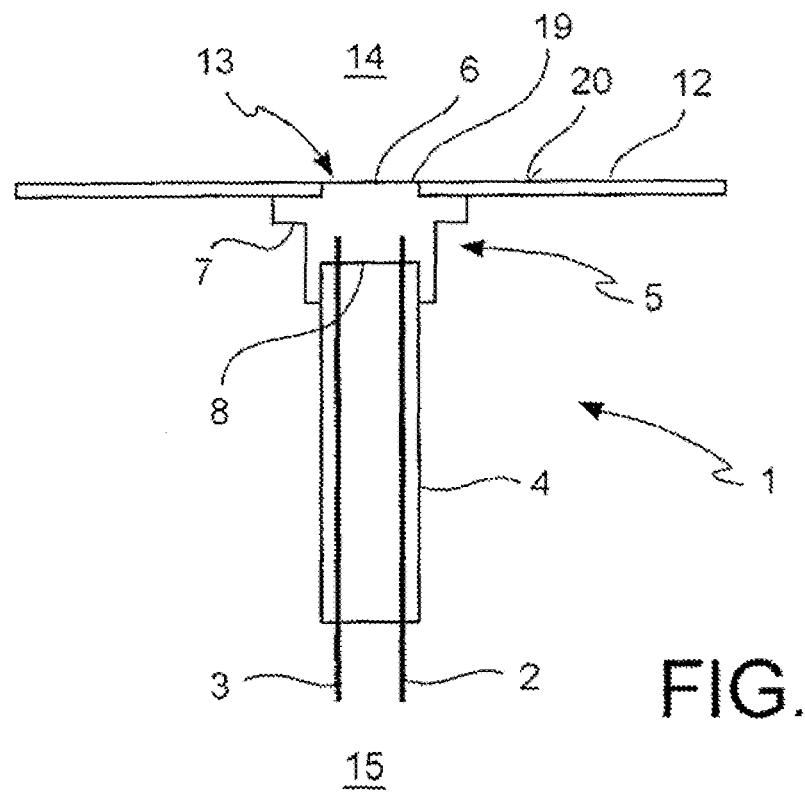
FIG. 2 is a sectional view of the sensor of FIG. 1, in the assembled and installed configuration.
Figure 1:
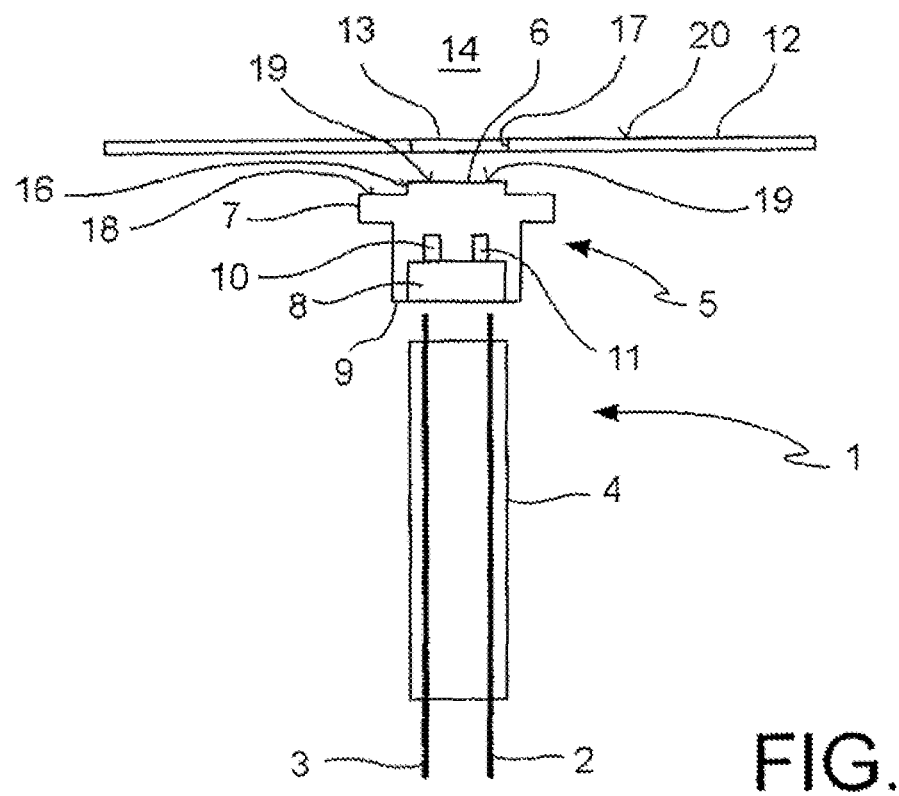
FIG. 1 is an exploded sectional view of a temperature sensor for burners according to an embodiment of the invention.
Figure 3:
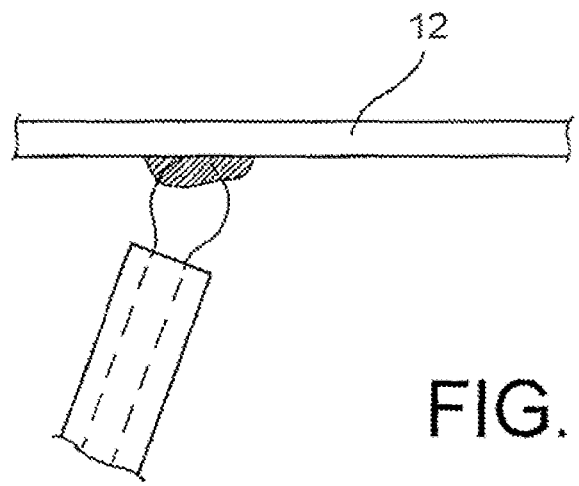
Figure 3A:
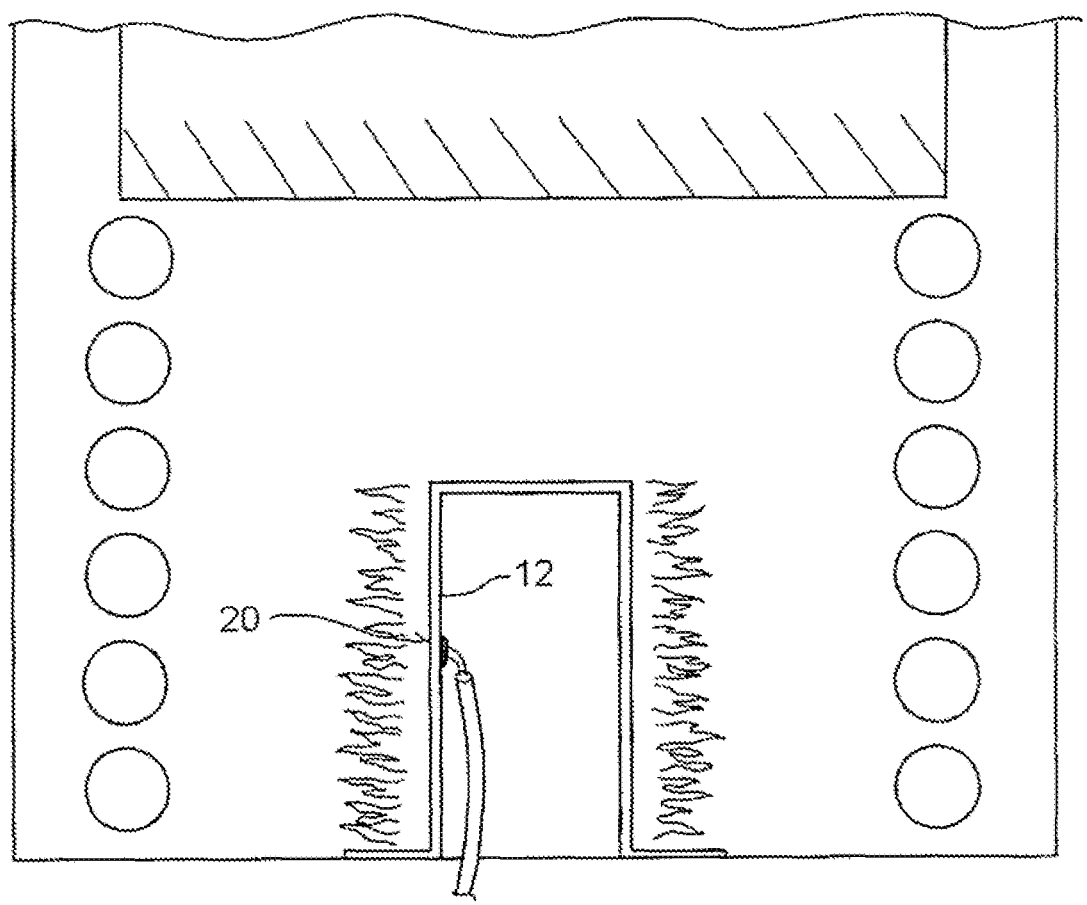
Figure 3B:
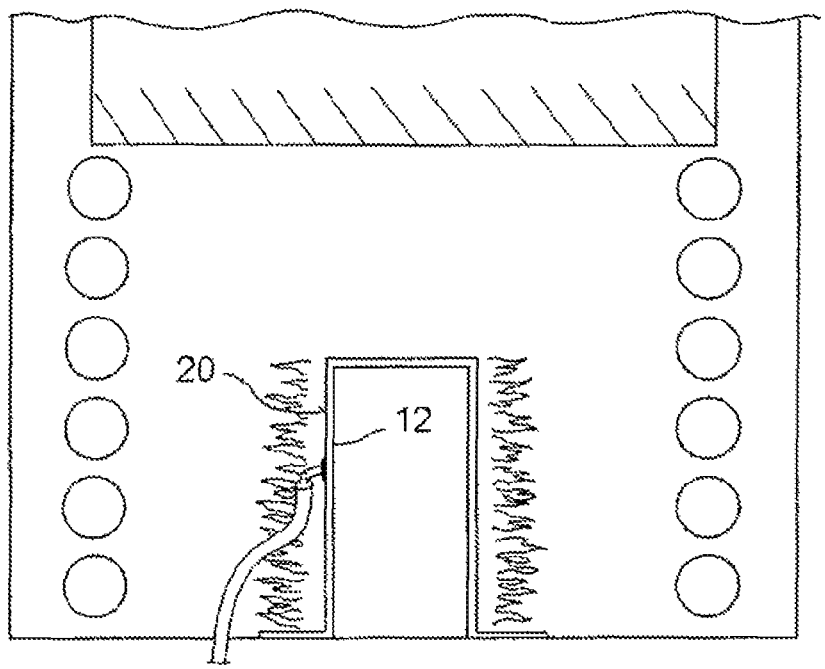
Figures 4, 5:
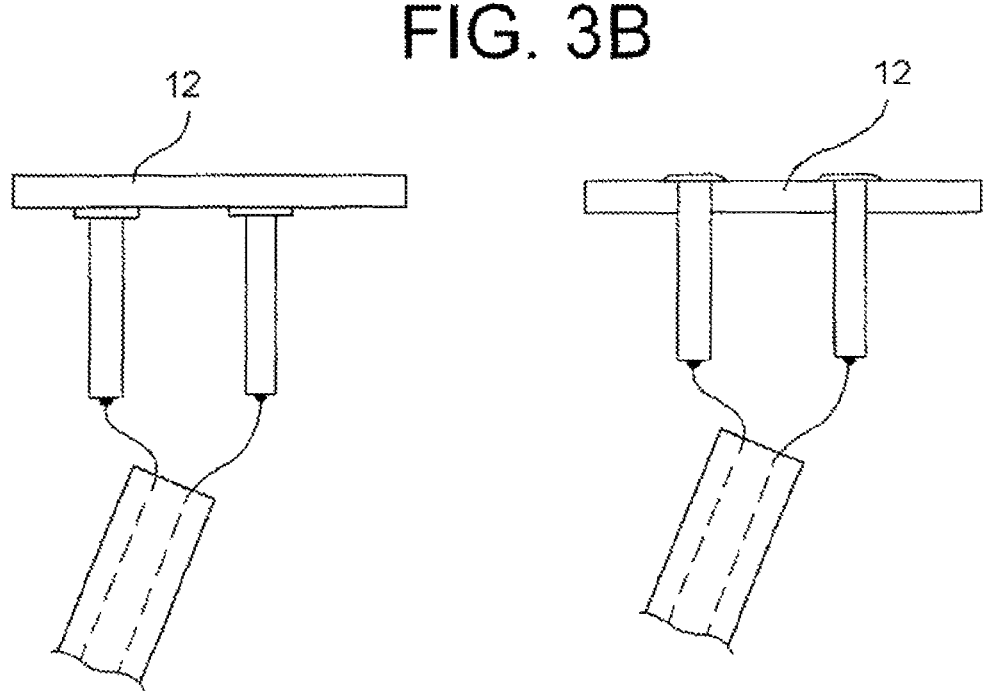

With reference to the embodiment illustrated in FIGS. 1 and 2, the head 5 may comprise a shoulder 7 forming an abutment surface facing the front side 14, thus implementing the above-mentioned second positioning surface 18.

The front portion 6 is formed in relief relative to the shoulder 7 and comprises an annular side surface 16 that is substantially perpendicular to the measurement front surface 19 so as to form a step between the measurement front surface 19 and the abutment surface (second positioning surface) 18. The annular side surface 16 implements the above-mentioned first positioning surface.

Advantageously, the measurement surface 19, the first positioning surface 16, and the second positioning surface 18 are substantially mutually centred and preferably coaxial.

Furthermore, the measurement surface 19 is preferably substantially planar and parallel to the second positioning surface 18. This allows positioning the temperature sensor head so that the measurement surface 19 thereof is parallel and aligned flush with a burning surface 20 of the burner wall 12 or, if it is desired and useful to the aims of the measurement, a positioning of the temperature sensor head can be obtained, so that the measurement surface 19 thereof projects by an extremely accurate and repeatable length.

On the rear side of the head 5 one or more, preferably two, thermocouple seats 10 are advantageously formed, 11 for the connection by welding of the two metal wires 2, 3. The thermocouple seats can be made by means of two holes spaced one from the other, so that each of the two metal wires is separately welded to the head 5.

The head can comprise thermocouple seats 10, 11, 10', 11' formed as blind holes (FIG. 1), or preferably as through holes (FIG. 6), and a single head 5 can comprise a plurality of thermocouple seats 10, 11, 10', 11' to receive 2 or more metal wires of one or more thermocouples.

In accordance with a further embodiment, the head 5 comprises a preferably cylindrical annular wall 9 on the rear side 15 thereof, defining internally a sheath seat 8 to receive a front end of the protection sheath 4.

The thermocouple seats 10, 11 can be advantageously formed within the sheath seat 8, so that the connection between the head 5 and the metal wires 2, 3 is protected and encapsulated within the sheath seat 8, the rear opening of which results to be stopped up by the sheath itself, which can be connected to the head 5 by a shape or interference connection, for example, by clamping or crimping, or welding of the annular wall 9 to or about the protection sheath 4 front end. The sheath itself is advantageously in a thermoresistant and substantially rigid material, such as to protect the metal wires and to facilitate the assembling of the sensor 1 to the burner.

The sheath can be manufactured in a metal and/or plastic and/or silicon and/or ceramic material, optionally containing mineral fibres to increase the thermoinsulating characteristics thereof and also the mechanical rigidity thereof. Preferably, the sheath 4 comprises a mineral insulated cable.

The metal wires can be selected (by way of non-limiting example) as follows:
type T: copper/constantan
type J: iron/constantan
type E: Chromel®/constantan
type K: Chromel®/Alumel®
type N: nicrosil/nisil
type R and S: platinum and rhodium/platinum
type B: platinum and rhodium,
in which Chromel® and Alumel® are registered trademarks by Hoskins Manufacturing Company.

Advantageously, the sensor 1 head 5 has a substantially rotation body shape, except for the thermocouple seats 10, 11 for the connection of the metal wires 2, 3.

The present invention also relates to a burner, for example, a burner of a heating device in general, or of a boiler with a combustion chamber having a burner wall 12 the outer surface of which implements a burning surface 20 at which the temperature is measured by the temperature sensor 1 hereto described and illustrated.

To this aim, a through opening forming the sensor seat 13 is implemented, for example, by punching or moulding, in the burner wall 12. In this manner, and thanks to the particular configuration of the front portion 6 (the head is advantageously obtained by turning or moulding), the latter results to be insertable and positionable in the sensor seat 13 with a high accuracy.

Advantageously, the burner wall 12 thickness and the front portion 6 length are selected so that the sensor measurement surface 19 is arranged flush with the burner wall 12 burning surface 20 to implement a substantial surface continuity of such burning surface 20. Alternatively, the burner wall 12 thickness and the front portion 6 length are selected so that the sensor measurement surface 19 projects in an accurate and repeatable manner relative to the burner wall 12 burning surface 20. With further advantage, the sensor 1 head 5, in particular the front portion 6 thereof, is of the same material of the burning surface 20.

In order to increase the rapidity of response of the temperature sensor, the head 5 is welded to the burner wall 12, preferably by laser welding or the like, in which the sensor seat 13 inner surface 17 and a corresponding surface of the head 5 facing thereto (preferably, the first positioning surface 16) are melted and welded one to the other so as to connect the head and the burner wall and to create a continuity of material of the burner wall at the sensor seat.

In accordance with a further aspect of the present invention (FIGS. 11-13), the front portion 6 has a substantially rotation body shape (for example, a cylindrical or frusto-conical shape) so as to be able to be rotatably inserted in the burner wall 12 sensor seat 13 (having a shape that is substantially complementary to the front portion 6 shape), and the shoulder 7 has an elongated shape (for example, substantially oval) in a transversal direction to the insertion direction of the head 5 in the burner wall 12 sensor seat 13.

In a burner with double curved wall with a burner wall 12 and a distribution wall 21 that define therebetween a curved interspace 22, the distribution wall 21 can comprise a locking opening 23 that is substantially aligned with the burner wall 12 sensor seat 13 and having a shape such as to allow the passage (inlet and outlet) of the shoulder 7 in a angular release position (FIG. 12) and to prevent the passage of the shoulder 7 (outlet and inlet) in at least one angular locking position (FIG. 13) different from the angular release position. Preferably, the distribution wall 21 locking opening 23 has a shape substantially complementary to the elongated, preferably oval, shape of the shoulder 7.

In this manner, by inserting the sensor 1 head with the shoulder 7 in the locking opening 23 and with the front portion 6 in the sensor seat 13, and by rotating the head 5 from the release position to the locking position (the sensor seat 13 acts as a centering), the shoulder 7 engages by interference the curved burner 12 and distribution 21 walls, and it is locked therebetween.

In order to further facilitate the assembling of the sensor 1, the shoulder 7 rear peripheral edge 25 (facing away from the front portion 6) has a bevel that allows the shoulder to slip by interference under the distribution wall 21 during the rotation from the release position to the locking position.

In order to maintain the locking position of the sensor 1, an outer spring clip 24 can be further provided, which is connected to the burner and suitable to engage the sensor 1 in the locking position and oppose to undesired rotations of the sensor 1.

This allows securing or replacing the sensor 1 to the burner in an extremely quick, accurate, and repeatable manner, and without any needs for welding operations.

The temperature sensor and the burner containing such sensor have a number of advantages.

The sheath-thermocouple-metal head assembly of the sensor 1 constitute an easily positionable component within the burner and securable therein with high positioning accuracy.

The sensor and the burner with the sensor allow protecting the thermocouple against oxidation phenomena of the welded joints, prevent displacements, mispositioning, and undesired deformations of the measurement surface (hot side of the thermocouple), and allow reducing the thermal inertia of the temperature measurement system.

Furthermore, the sensor and the burner according to the invention allow the measurement of the temperature of a burning surface of the burner, and at the same time they ensure the continuity of surface of such burning surface.

These and other characteristics of the sensor and the burner according to the invention promote a use thereof in boilers, the temperature control of which requires a high reliability and durability, as well as a high rapidity of response of the temperature sensor.

It shall be apparent that to the temperature sensor 1 and to the burner containing such sensor 1 according to the present invention, those of ordinary skill in the art, with the aim of meeting contingent, specific needs, will be able to make a number of modifications and variations, all anyhow falling within the protection scope of the invention, as defined by the following claims.

The invention claimed is:

1. A temperature sensor for a burner, said sensor comprising:
    two metal wires implementing a thermocouple;
    a protection sheath receiving the two metal wires;
    a head in metal material having a front side intended to be facing the environment, the temperature of which is intended to be measured, and a rear side opposite the front side;
    said two metal wires being connected in a thermal exchange relationship to said rear side of said head, in which said head comprises a front portion connectable to a burner wall of said burner so that the thermocouple is connectable to the burner by means of said metal head; wherein
    said head comprises
    a front portion intended to be inserted in a sensor seat of a burner wall of the burner;
    a first positioning surface suitable to engage an inner surface of the sensor seat so as to implement a positioning reference of the head in the plane of the burner wall;
    a second positioning surface transverse to the first positioning surface and suitable to abut against said burner wall in the proximity of said sensor seat, so as to implement a positioning reference of the head in the transverse direction to the burner wall plane and
    said front portion comprises a measurement surface intended to be exposed to the environment, the temperature of which is intended to be measured, and said first positioning surface is transverse to said measurement surface, and
    said head comprises a shoulder defining an abutment surface facing the front side and forming said second positioning surface,
    wherein said front portion projects from said shoulder towards the front side and comprises an annular side surface substantially perpendicular to the measurement front surface and forming said first positioning surface.

2. The sensor according to claim 1, wherein said measurement surface, said first positioning surface and said second positioning surface are coaxial.

3. The sensor according to claim 1, wherein said measurement surface is substantially planar and substantially parallel to the second positioning surface.

4. The sensor according to claim 1, wherein said head comprises one or more thermocouple seats on the rear side thereof for the connection by welding of said two metal wires.

5. The sensor according to claim 4, wherein said thermocouple seats comprise two holes.

6. The sensor according to claim 1, wherein each single metal wire is welded and/or brazed separately to said head.

7. The sensor according to claim 1, wherein said head comprises an annular wall on the rear side thereof, which defines a sheath seat receiving a front end of the protection sheath.

8. A temperature sensor for a burner, comprising:
    two metal wires implementing a thermocouple;
    a protection sheath receiving the two metal wires;
    a head in metal material having a front side intended to be facing the environment, the temperature of which is intended to be measured, and a rear side opposite the front side;
    said two metal wires being connected in a thermal exchange relationship to said rear side of said head, in which said head comprises a front portion connectable to a burner wall of said burner so that the thermocouple is connectable to the burner by means of said metal head, wherein said head comprises:

a front portion intended to be inserted in a sensor seat of a burner wall of the burner;

a first positioning surface suitable to engage an inner surface of the sensor seat so as to implement a positioning reference of the head in the plane of the burner wall;

a second positioning surface transverse to the first positioning surface and suitable to abut against said burner wall in the proximity of said sensor seat, so as to implement a positioning reference of the head in the transverse direction to the burner wall plane, wherein said head comprises a shoulder defining an abutment surface facing the front side and forming said second positioning surface, wherein said front portion projects from said shoulder towards the front side and comprises a measurement front surface facing the front side and intended to be exposed to the environment the temperature of which is intended to be measured, as well as an annular side surface substantially perpendicular to the measurement front surface and forming said first positioning surface.

9. The sensor according to claim 8, wherein said protection sheath and said sensor head are mutually connected, so as to form a substantially rigid head—thermocouple—sheath assembly.

10. The sensor according to claim 8, wherein
said front portion has a substantially cylindrical shape so as to be able to be rotatably inserted in said burner wall sensor seat, and
said shoulder has an elongated shape in a transverse direction to the insertion direction of the head in the sensor seat,
said shoulder being insertable in a locking opening of a distribution wall of a burner with double curved wall and lockable by interference in the interspace between the two curved walls by rotation from an angular release position, in which the locking opening allows the passage of the shoulder, to an angular locking position, in which the locking opening prevents the passage of the shoulder.

11. A temperature sensor for a burner, comprising:
two metal wires implementing a thermocouple;
a protection sheath receiving the two metal wires;
a head in metal material having a front side intended to be facing the environment, the temperature of which is intended to be measured, and a rear side opposite the front side;
said two metal wires being connected in a thermal exchange relationship to said rear side of said head, in which said head comprises a front portion connectable to a burner wall of said burner so that the thermocouple is connectable to the burner by means of said metal head,
wherein said head comprises an annular wall on the rear side thereof, which defines a sheath seat receiving a front end of the protection sheath wherein said thermocouple seats are formed within said sheath seat, so that the connection between the head and the metal wires is protected and encapsulated within the sheath seat the rear opening of which results to be stopped up by the protection sheath.

12. A burner comprising:
a burner wall defining a through opening forming a sensor seat,
a temperature sensor comprising:
two metal wires implementing a thermocouple;
a protection sheath receiving the two metal wires;
a head in metal material having a front side intended to be facing the environment, the temperature of which is intended to be measured, and a rear side opposite the front side;
said two metal wires being connected in a thermal exchange relationship to said rear side of said head, in which said head comprises a front portion connectable to a burner wall of said burner so that the thermocouple is connectable to the burner by means of said metal head,
wherein said front portion of said sensor is received in said sensor seat, and
wherein said burner wall thickness and said front portion length are configured so that said measurement surface of said sensor is arranged flush with a burning surface of said burner wall such as to implement therein a substantial continuity of surface.

13. The burner according to claim 12, wherein the sensor head or the head front portion and a burning surface of said burner wall are made in the same material.

14. The burner according to claim 13, wherein the sensor head or the head front portion and a burning surface of said burner wall are made in the same material.

15. The burner according to claim 12, wherein the sensor head is welded to the burner wall, between the sensor seat and the front portion, so as to implement a continuity of material of the burning surface at the sensor seat.

16. The burner according to claim 12, wherein the sensor head is welded to the burner wall, between the sensor seat and the front portion, so as to implement a continuity of material of the burning surface at the sensor seat.

17. A burner with double curved wall with a burner wall and a distribution wall defining a curved interspace therebetween, wherein said burner wall comprises a
through opening forming a sensor seat and said distribution wall comprises a locking opening substantially aligned with the sensor seat, further comprising a sensor including:
two metal wires implementing a thermocouple;
a protection sheath receiving the two metal wires;
a head in metal material having a front side intended to be facing the environment, the temperature of which is intended to be measured, and a rear side opposite the front side;
said two metal wires being connected in a thermal exchange relationship to said rear side of said head, in which said head comprises a front portion connectable to a burner wall of said burner so that the thermocouple is connectable to the burner by means of said metal head,
said metal head comprising:
a front portion intended to be inserted in a sensor seat of a burner wall of the burner;
a first positioning surface suitable to engage an inner surface of the sensor seat so as to implement a positioning reference of the head in the plane of the burner wall;
a second positioning surface transverse to the first positioning surface and suitable to abut against said burner wall in the proximity of said sensor seat, so as to implement a positioning reference of the head in the transverse direction to the burner wall plane,
wherein said front portion has a substantially cylindrical shape so as to be able to be rotatably inserted in said burner wall sensor seat, and said shoulder has an elongated shape in a transverse direction to the insertion direction of the head in the sensor seat,
said shoulder being insertable in a locking opening of a distribution wall of a burner with double curved wall and lockable by interference in the interspace between the two curved walls by rotation from an angular release position, in which the locking opening allows the passage of the shoulder, to an angular locking position, in which the locking opening prevents the passage of the shoulder.

* * * * *